United States Patent [19]

Honarpour

[11] Patent Number: 5,314,019
[45] Date of Patent: May 24, 1994

[54] METHOD FOR TREATING FORMATIONS

[75] Inventor: Mehdi M. Honarpour, Highland Village, Tex.

[73] Assignee: Mobil Oil Corporation, Fairfax, Va.

[21] Appl. No.: 925,536

[22] Filed: Aug. 6, 1992

[51] Int. Cl.$^5$ .................... E21B 33/138; E21B 43/22
[52] U.S. Cl. ................................. 166/270; 166/50; 166/292; 166/295
[58] Field of Search ............... 166/50, 270, 292, 294, 166/295, 300

[56] References Cited

U.S. PATENT DOCUMENTS

| | | | |
|---|---|---|---|
| 1,816,260 | 7/1931 | Lee | 166/50 |
| 4,022,279 | 5/1977 | Driver | 166/271 |
| 4,160,481 | 7/1979 | Turk et al. | 166/272 |
| 4,249,604 | 2/1981 | Frazier | 166/263 |
| 4,397,360 | 8/1983 | Schmidt | 175/61 |
| 4,402,551 | 9/1983 | Wood et al. | 299/5 |
| 4,410,216 | 10/1983 | Allen | 299/2 |
| 4,436,165 | 3/1984 | Emery | 166/50 X |
| 4,444,265 | 4/1984 | Schmidt | 166/50 X |
| 4,705,431 | 11/1987 | Gadelle et al. | 166/50 X |
| 4,722,397 | 2/1988 | Sydansk et al. | 166/50 X |
| 4,928,763 | 5/1990 | Falk | 166/50 X |

OTHER PUBLICATIONS

Bruckert, "Horizontal Well Improves Oil Recovery From Polymer Flood", *Oil and Gas Journal*, Dec. 18, 1989, pp. 35–39.
"Well Productivity Increase from Drain Holes as Measured by Model Studies", Petroleum Transactions, AIME, vol. 204, 1955, pp. 30–33.
SPE 12792 (1984).
SPE/DOE 24190 (1992).
SPE/DOE 24192 (1992).
SPE/DOE 24194 (1992).

Primary Examiner—George A. Suchfield
Attorney, Agent, or Firm—A. J. McKillop; George W. Hager, Jr.

[57] ABSTRACT

A method for treating a formation having zones of varying permeabilities to improve the sweep efficiency of a drive fluid through the formation. At least one radial, relative horizontal bore is formed from a relative vertical wellbore and extends outward into a high-permeability zone of said formation. A gelant is injected into said formation through the radial bore(s) and flows into the higher-permeability zones of the formation. After the gelant is in place, the wellbore is shut-in to allow the gelant to set to form a flow-blocking gel in the treated zones of formation. Secondary recovery operations are then resumed and the drive fluid (e.g. water) will now flow through the previously unswept (i.e. less-permeable zones) of the formation.

8 Claims, 1 Drawing Sheet

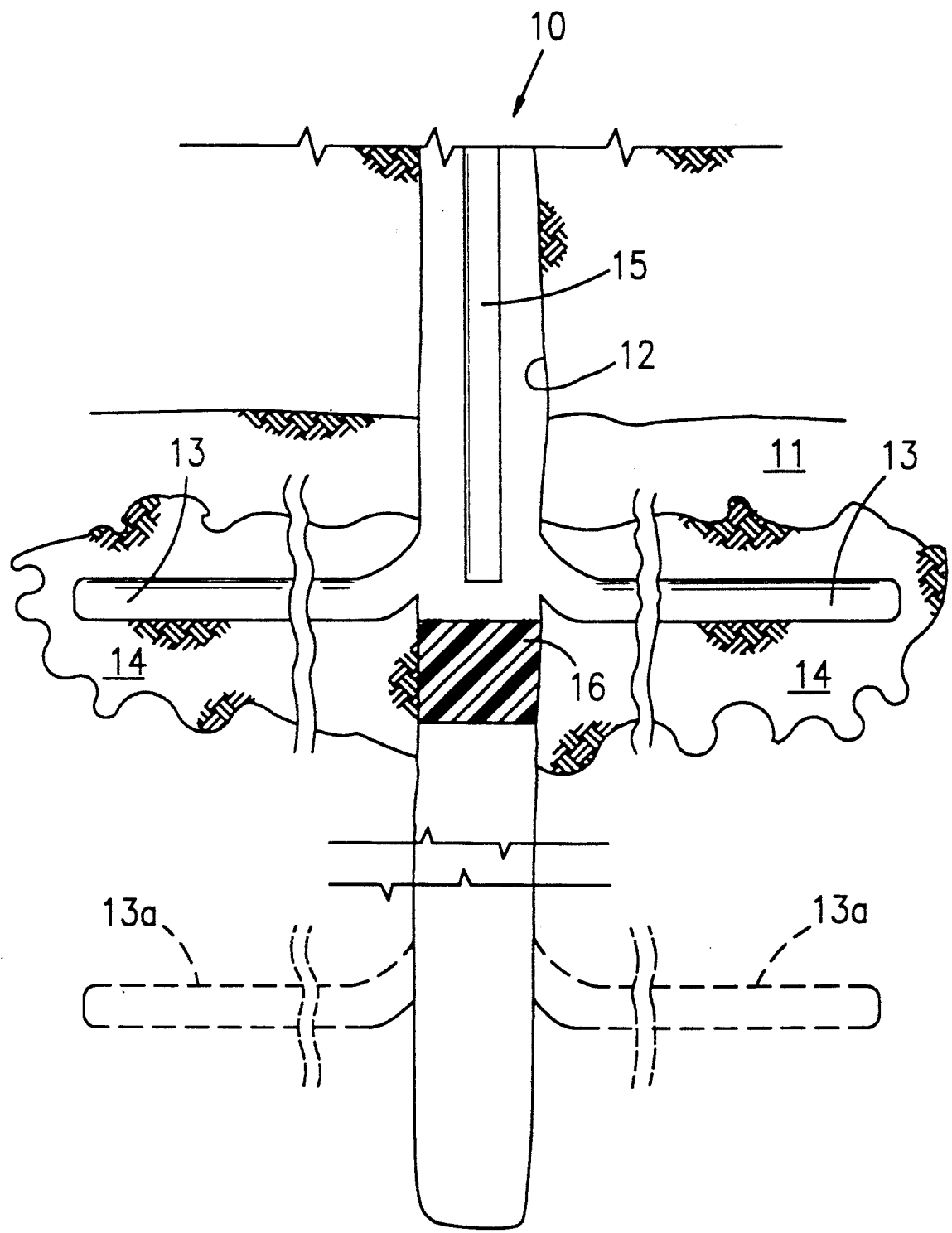

METHOD FOR TREATING FORMATIONS

DESCRIPTION

1. Technical Field

The present invention relates to a method for treating subterannean formations and in one of its aspects relates to a method for treating a hydrocarbon-bearing formation to improve the sweep effecency of a drive fluid by injection a gelling polymer solution into the producing formation through horizontal bores drilled into the formation from a vertical wellbore to better distribute the polymer within the more permeable zones of the formation.

2. Background

It is well known that most hydrocarbon-producing reservoirs still contain substantial amounts of residual oil even after a reservoir has undergone secondary recovery operations, e.g. water and/or gas flooding. This is especially true where the reservoir lies in an in-homogenous formation which has several zones of varying permeabilities. When producing these in-homogenious reservoirs, the oil flows more readily from the higher permeability zones than it does from the less permeable zones thereby leaving substantial more residual oil in the less permeable zones.

Even during secondary recovery operations where a drive fluid (e.g. water and/or gas floods) is injected to displace the oil, the higher-permeable zones or layers (sometime call "thief zones") effectively act as pipelines or conduits between the injection and production wells. Accordingly, the drive fluid readily flows through the more-permeable zones effectively bypassing the less permeable layers which contain most of the residual oil. This results in early "break-through" of the drive fluid at the production well(s) which, in turn, results in poor sweep efficency through the formation and low recovery of the residual oil from the less permeable zones.

Efforts continue to be made to improve the sweep efficency through a reservoir in order to recover greater amounts of residual oil known to be in the reservoir. One such method proposed for improving sweep efficiency of a drive fluid involves modifying the flow profile through the formation by injecting a aqueous, gel-forming polymer into the formation from the wellbore. Ideally, the polymer gel solution will take the path of least resistance and will flow into the more permeable zones of the producing formation where it "sets up" to form a flow-blocking gel in the high-permeable zones. Then, when a drive fluid, e.g. water, is injected into the treated formation, it will bypass the high-permeable zones and be diverted into and through the less-permeable zones thereby displacing substantial amounts of the residual oil therefrom.

For a good discussion of known polymer gel treatments of producing formations, see: (a) "Impact of Permeability and Lithology on Gel Performance", R.S. Seright et al, (SPE/DOE 24190); (b) "Gel Placement in Heterogeneous Systems with Crossflow", K.S. Sorbie, (SPE/DOE 24192); and (c) "A New Gelation technology for In-Depth Placement of $Cr^{+3}$/Polymer Gels in High-Temperature Reservoirs, T.P. Lockhart et al, (SPE/DOE 24194); all of which were presented at the SPE/DOE Eighth Symposium of Enhanced Oil Recovery, Tulsa, Okla., Apr. 22-24, 1992.

Polymer gel treatments such as described above have been successfully tested in the laboratory and have shown limited success in the field. However, mathematical studies have shown that in order for an aqueous, polymer gel solution to be adequately placed into the more-permeable zones of a formation from a standard wellbore (e.g. a vertical wellbore extending through the producing interval), the vertical permeabilities of the reservoir should be within approximately of a thousandth of the horizontal permeabilities of the formation (i.e. $k_v/h_h < 0.001$). Unfortunately, these conditions are seldom, if ever, found in actual reservoirs.

Further, when polymer gels (e.g. polyacrylamides) are injected into a formation over a relatively long interval of the formation, e.g. from a vertical wellbore, the polymer has a tendency to shear which, in turn, reduces the viscosity of the polymer thereby increasing the mobility ratio of the injected solution. As will be recognized, this increase in mobility ratio substantially reduces the effectiveness of the treatment in that the drive fluid which follows the polymer injection is likely to still end up in the high-permeable zones thereby bypassing the polymer therein with little or no significant improvement in oil recovery.

SUMMARY OF THE INVENTION

The present invention provides a method for treating a formation having zones of varying permeabilities to improve the sweep efficiency of a drive fluid (e.g. water, steam, gas, chemicals, etc. or a combination thereof) through the formation. Further, the present method may have application in preventing water or gas "conning" or otherwise encroaching into producing wells by isolating or immobilizing a gas cap and/or the aquifer from the producing zone of a reservoir. In carrying out the present method, at least one radial, relative horizontal bore (usually a plurality lying in one or more planes along the wellbore) is drilled and completed from a relative vertical wellbore which, in turn, traverses the formation to be treated. The radial bore extends outward from the wellbore into a high-permeability zone of said formation, preferably at the top thereof and in the direction of maximum permeability of said zone.

A gelant which is in an aqueous solution is injected down the wellbore and into said formation through the radial bore(s) and since the gelant seeks the path of least resistance, it will primarily flow into the higher-permeability zones of the formation. Since the radials extend into the formation for substantial distances, a much better distribution of the gelant into these higher-permeability zones of the formation is attainable over the prior art methods. After the gelant is in place, the wellbore is shut-in for the period required for the gelant to set to form a flow-blocking gel in the treated zones of formation. The gelant, upon setting, modifies the permeability profile of the formation by blocking flow through the high-permeability zones and ideally produces a a horizontally-extending, radial gel layer which has a radius equal to or possibly even greater than the horizontal length of radials, themselves.

The radials may then be plugged or otherwise closed off, if desired, and secondary recovery operations either initiated or resumed through well. That is, a drive fluid (e.g. water) is injected into treated formation through the wellbore and will now flow through the previously unswept or poorly-swept zones (i.e. less-permeable zones) of the formation. Due to the substantial flow barriers formed by the gel in the high-permeability zones, the sweep efficiency of the drive fluid will be substantially increased and additional oil can be recovered.

BRIEF DESCRIPTION OF THE DRAWING

The actual construction, operation, and apparent advantages of the present invention will be better understood by referring to the drawing wherein:

The FIGURE is an elevational view, partly in section, illustrating the lower end of well having radial, horizontal bores extending into a formation which is to be treated in accordance with the present invention.

BEST KNOWN MODE FOR CARRYING OUT INVENTION

Referring more particularly to the drawing, the FIGURE illustrates the lower portion of a well 10 which has been completed into a producing formation 11. Well 10 is comprised of a wellbore 12 which is typically a substantially relatively vertical bore which extends from the surface (not shown) through the production interval of formation 11. However, as will be understood in the art, wellbore 12 may also be slanted or contain portions which are substantially horizontal. Wellbore 12 may be cased and perforated adjacent formation 11 or it may "open-hole" as illustrated, as will be fully understood in the art.

In a typical secondary recovery operation, a drive fluid (e.g. water and/or gas) is injected into an injection well and flows through the formation to displace hydrocarbons (e.g. oil) from the formation towards a production well. The injection and production wells may be spaced from each other as in "in-line" drives, 5-spot patterns, etc., or a single well may function as both the injection well and as the production well as in an "huff-and-puff" operation. As will be understood, well 10 of the present invention may be an injection well, a production well, or a combined injection-production well depending on the particular reservoir involved.

When a drive fluid is injected into a formation, it, like any other fluid, has a tendency to follow the path of least resistance and flow through the higher permeability zones of formation 11. Note: While a high-permeability zone 14 has been illustrated in the FIGURE for the sake of description, it should be recognized that such high-permeable zones may not be as clearly delineated from the less-permeable zones in an actual subterranean formation and may not follow any particular pattern. The drive fluid flows through these high-permeable zones to displace the oil therefrom towards a production well while effectively bypassing the less-permeable zones leaving substantial amounts of residual oil therein. As used herein, the terms "high-permeability", "less-permeable", and similar terms are all used as relative terms and are not intented to define or designate any particular or specific values of permeability.

One known method which has been proposed to alleviate the early break-through of drive fluid through the formation involves first blocking or restricting flow through the high-permeable zones before the drive fluid in injected. Typically, this is to be done by first injecting a "gelant" (e.g. polymer gel solution) having a water-like viscosity into the formation across the producing interval of the wellbore. Next, water (e.g. brine) is injected through the wellbore to displace the gelant away from the wellbore and further into the formation. Sufficient water is injected so that hopefully the rear of the gelant bank in the high-permeable zone outruns the front of the gelant bank in an adjacent less-permeable zone. The well is then shut in for a period sufficient to allow the gelant to set to form a flow-blocking gel before injection of the drive fluid is resumed. For a more complete description of such a process, see SPE/DOE 24192, cited above.

However, in carrying out this process wherein the gelant solution is injected into a wellbore over a relatively large production interval of the formation (e.g. injected directly into the formation 11 from wellbore 12), it is believed that the vertical permeabilities of formation 11 must be in the order of a thousandth of the horizontal permeabilities of the formation, (i.e. $k_v/k_h<0.001$) for the procedure to be effective. Also, when some gelants are injected over a relatively wide production interval, i.e. a vertical interval of the formation, the gelant has a tendency to shear which reduces its viscosity and adversely increases its mobility ratio in the formation.

In accordance with the present invention, a gelant is injected into formation 11 through radial bores 13 which extend outward into the formation substantially perpendicular from the vertical wellbore 12. As used herein, the terms "horizontal" and "vertical" are intended to be relative terms in relation to each other and do not necessary indicate the true direction of a respective bore.

Referring again to the FIGURE, one or more radial, relative horizontal bores 13 are drilled outward from relative vertical wellbore 12 and may extend for substantial distances (e.g. one-half mile or longer) horizontally into formation 11. The radial bores 13 can be drilled from an existing well 10 or they may be drilled from newly-drilled wellbores depending on the actual circumstances involved in producing a particular reservoir. The technology involved in drilling horizontal bores from vertical wells is well developed and is well known in the art, see: U.S. Pat. Nos. 1,816,260 and 4,397,360.

The trajectories of radial bores 13 are preferably placed in the high permeability zones 14 of formation 11 and in the direction of maximum permeability as determined from well logs and the like as will be understood in the art. Further, radials 13 are preferably placed at the top of any known thief zones 14 in the formation so that the treating solution, when injected, will invade and flood the whole thief zone even if a significant gravitational effect is present. A plurality of radials 13 may be drilled in the same plane while additional plurality of radials (dotted lines 13a in the FIGURE) may also be drilled at in other planes which are spaced longitudinally along wellbore 12 if the situation requires.

Once radials 13 have been drilled and completed, a packer or plug 16 may be set in wellbore 12 to isolated the well interval adjacent radials 13. A tubing 15 is lowered and a gelant solution is injected down the tubing and into the radials 13. The "gelant" used in the present invention can be selected from any gelant which is capable of flowing into the high-permeable zones and forming a flow-blocking gel therein. Examples of such gelants are those which have been previously proposed for this purpose. More specifically, typical gelants used in the present invention may include polyacrylamides, acrylamide co-polymers, biopolymer xanthan gum, etc. and cross-linking agents such as trivalent chromium ($Cr^3$) which chemically bonds with the polymer to give a crosslinked complex. For further examples of gelants which may be used in the present invention, see those described and discussed in detail in SPE/DOE papers 24190, 24192, 24194, cited above and incorporated herein by reference.

The aqueous gelant solution is injected through radials 13 and, as in previous methods, seeks the path of least resistance. However, since the radials extend for substantial distances into the high-permeable zones, a much better distribution of the gelant into the higher-permeability zones is achieved. As the gelant flows into these zones, it displaces at least part of any residual oil that may be remaining in the high-permeability zones into the less-permeability zones. It also modifies the permeability profile of the formation by blocking flow through the high-permeability zones and ideally produces a horizontally-extending, radial gel layer which has a radius equal to or possibly even greater than the horizontal length of radials 13.

Because the gelant continues to flow in the path of least resistance, the injection of gelant can be continued for the length of time necessary to cover a large region of interest or as long as the flow continuity of the formation allows. The injection volume and pressure are monitored and can be used to (a) calculate the volume of the formation being treated and (b) detect any changes that may occur in the conductivity of the formation relative to the injected fluid. If the gelant used is one which requires mixing with a separate cross-linking solution for before gelation can occur, an aqueous solution of the gelant is first injected through radials 13 until a predetermined volume is injected and then the necessary volume of the cross-linking agent is injected through the same radials.

After the gelant (and separate cross-linking agent, if required) are in place, well 10 is normally closed in for the period required for a particular gelant to gel and form a plugging material in the treated zones of formation 11. Radials 13 may then be plugged or otherwise closed off, if desired, and secondary recovery operations either initiated or resumed through well 10. That is, a drive fluid (e.g. water) is injected into treated formation 11 through wellbore 12 and will now flow through the previously unswept or poorly-swept zones (i.e. less-permeable zones) of the formation. Due to the flow barriers formed by the gel and the reduced channelling through the formation resulting from the effective placement of the gel, the sweep efficiency of the drive fluid will be substantially increased.

The present process can be repeated from the same wellbore 12 by positioning additional radial, horizontal bores at the same or different intervals (e.g. 13a ) into varying permeability zones of formation 11 as they become "watered-out" during a recovery operation.

What is claimed is:

1. A method for treating a formation having zones of varying permeabilities to improve the sweep efficiency of a drive fluid through the formation wherein a wellbore traverses the formation, said method comprising:
   forming at least one radial bore outward from said wellbore into one of said zones having a relatively high-permeability;
   injecting an aqueous gelant solution into said formation through said at least one radial bore whereby said gelant solution flows into said high-permeability zone of said formation; and
   shutting-in said wellbore for a time sufficient for said gelant solution to set to form a flow-blocking gel within said high-permeability zone of said formation to restrict further flow through said high-permeability zone while allowing flow through the less permeable of said zones to thereby improve the sweep efficiency of subsequently injected fluids.

2. The method of claim 1 including:
   injecting said drive fluid through said wellbore after said gelant solution has set.

3. The method of claim 2 wherein said radial bore extends outward from said wellbore into said high-permeability zone of said formation and in the direction of maximum permeability of said zone.

4. The method of claim 3 wherein said radial bore is positioned near the top of said zone of high-permeability.

5. The method of claim 4 wherein said wellbore is substantially relatively vertical and said at least one radial bore is substantially relatively horizontal.

6. The method of claim 4 wherein said at least one radial bore comprises a plurality of radial bores extending from said wellbore in substantially the same plane.

7. The method of claim 4 wherein said at least one radial bore comprises a plurality of radial bores extending from said wellbore in one plane and at least one additional plurality of radial bores extending from said wellbore in another plane which is spaced from said one plane along said wellbore.

8. The method of claim 1 wherein said gelant is selected from the group of polyacrylamides, acrylamide copolymers, biopolymer, xanthan gum, and a cross-linking agent.

* * * * *